Aug. 27, 1968   J. A. DODD   3,399,112
SHEATHED FUEL ELEMENTS FOR NUCLEAR REACTORS
Filed May 17, 1967 ated Aug. 27, 1968

United States Patent Office 3,399,112

1

3,399,112
SHEATHED FUEL ELEMENTS FOR
NUCLEAR REACTORS
John Alan Dodd, Warrington, England, assignor to United
Kingdom Atomic Energy Authority, London, England
Filed May 17, 1967, Ser. No. 639,087
Claims priority, application Great Britain, May 26, 1966,
23,699/66
2 Claims. (Cl. 176—79)

ABSTRACT OF THE DISCLOSURE

A fuel element for a nuclear reactor has a vent path for the removal from the element of the gases released from the fuel in service. This vent path comprises an extension of the fuel element sheath and this extension is enshrouded by a hood to form a diving bell gas trap. Situated in this diving bell gas trap is a non-return valve in the form of a metallic cup closure having a lip, the lip being so directed as to oppose flow towards the fuel but allow flow in the opposite direction.

---

Figure 2:
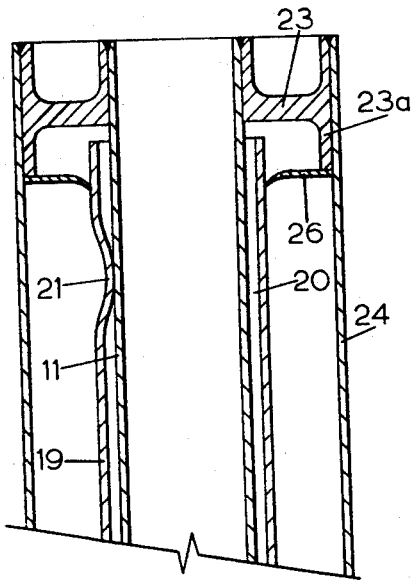

The present invention relates to sheathed fuel elements for nuclear reactors; it is applicable, as subsequent description will show, both to the sealed and to the vented types of nuclear fuel. In sealed fuel such gases as are released from the fuel content of the elements during irradiation thereof are prevented from escaping into the coolant by which the elements are cooled; in vented fuel, such gases are deliberately allowed egress into the coolant.

According to the invention a sheathed fuel element for a nuclear reactor has the interior of the sheath blocked beyond one end of a body of fuel contained therein by a non-return valve which is in the form of a metallic cup washer having a lip, the lip being engaged resiliently and continuously along its edge with an adjacent wall and being so directed as to oppose flow towards the fuel but allow flow in the opposite direction. This construction of non-return valve has particular relevance for the slender fuel pins which are a typical form for fuel elements designed for use in reactors with high fuel ratings, such as fast reactors; it is also particularly relevant where the fuel is a ceramic, such as an oxide, which is prone to release fission product gases. Bearing in mind that fuel pins will typically have a diameter less than 0.5 inch, and probably about 0.2 inch, the valve construction in accordance with the invention can afford the requisite simplicity; also it can afford reliability in the corrosive conditions for which the fission product gases are at least in part responsible, the implication being that the metal employed for the cup washer is chosen for resistance to the relevant corrosive effects. Stainless steel is the preferred metal.

In sealed fuel, the role of the non-return valve may be to prevent released gases which have already passed through the valve to some storage facility, such as a void length of the sheath interior, from escaping to the coolant through a failure of the sheathing occurring somewhere along the fuelled length; it is of course along the fuelled length that the vulnerability of the sheathing is greatest on account of the high fuel temperature and that the consequences of a major escape are likely to be most serious, there being the possibility that adjacent fuel elements might be deprived of contact with coolant by the escaping gas such that the initial sheathing failure leads to failures in other elements.

In vented fuel, the non-return valve may suffice, especially with liquid coolants, such as low melting point metals, to prevent ingress of coolant whilst allowing egress of gases released from the fuel. In this case the metallic cup washer constituting the valve would be disposed in the vent path and may be arranged to be exposed directly to the coolant.

The non-return valve in accordance with the invention may be incorporated in a fitting fixed within or to the fuel element sheathing. Such fittings may also provide the wall with which the cup seal lip is engageable and in this case may therefore include a tubular component with an accurately finished bore and a mounting by which the metallic cup seal is supported in the bore with the lip engaged with the bore wall.

Figure 1:
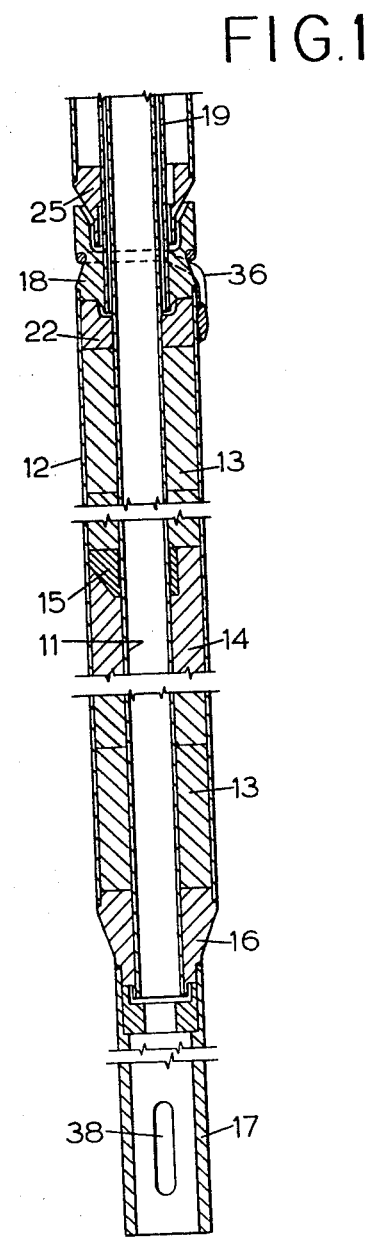

The invention will be further described with reference to an embodiment designed for service in a liquid cooled nuclear reactor core, more specifically a fast reactor cooled by a low melting point metal assumed for the purposes of the present example to be sodium. The relevant features of this embodiment which is taken by way of example only, are illustrated in the accompanying drawings wherein FIGURE 1 shows a longitudinal section of a type of fuel element which by virtue of its elongated slender form is more commonly referred to as a "fuel pin," and FIGURE 2 shows the upper end of this fuel element but drawn to a larger scale for clarity.

In the fuel pin of the figures, stainless steel inner and outer sheaths in the form of coaxial thin-walled tubes are denoted 11 and 12 respectively. The separation between these sheaths forms an annular space which contains a filling constituted by pellets, such as 12, of breeder fuel at the upper and lower ends and a length of particulate enriched fissile fuel 14 extending between these upper and lower breeder sections. It is assumed herein that the enriched fissile fuel is in a ceramic form, for example, a mixture of the dioxides or uranium and plutonium, of which the particles are compacted to a preselected percentage of the theoretical density. At 15 there is indicated a molybdenum end spacer for the fuel, this spacer being brazed or otherwise rigidly connected to the inner sheath 11 but slidably engaged with the outer sheath. An identical end spacer is interposed between the lower breeder section and the fuel length, and similar spacers are introduced at intervals within the length of fuel itself.

At their lower ends the sheaths are rigidly fixed together by welding to a bottom end cap 16. This end cap carries a downwardly projecting locating tube 17 through the hollow interior of which a flow of coolant can reach the inside of the inner sheath.

Towards the upper end of the outer sheath 12 there is a flange-like connecting piece 18, otherwise referred to as a top end cap, which serves to connect the outer sheath to an extension piece 19 in the form of a uniform section length of thin-walled cylindrical stainless steel tube having a smaller diameter than the outer sheath. This extension piece embraces the inner sheath 11 whilst leaving a narrow annular vent clearance 20. Through this clearance it will be seen that the annular space between the sheaths containing the fuel material has communication with the exterior of the fuel pin. In order to provide some transverse location of the extension piece 19, it is dimpled inwardly, as at 21, at three circumferentially equispaced locations, such projections making engagement with the inner sheath. Interposed between the top breeder section 13 and the top end cap 18 is a stainless steel knitmesh filter 22.

A terminal portion of the inner sheath protruding beyond the extension piece 19 has attached thereto by means of a channelled annular connecting piece 23 a hood 24 which enshrouds the extension piece like a skirt and at its end inwardly of the fuel pin carries a fitting 25. This fitting engages the extension piece 19 at circumferentially equispaced locations to provide transverse location for the hood and between these points of engagement affords an opening for coolant entry. Such hood serves to form with the vent clearance 20 what is known as a lute or diving bell gas trap. Its provision is especially necessary where the pins have the vent clearance at the top as distinct from the bottom, this being the case in the example under consideration. The length of the hood should be such that the distance between the coolant entry opening afforded by the fitting 25 and the top of the extension piece 19 gives, when taken in conjunction with the radial spacing of the hood from the extension piece, a sufficient volume to ensure that the level of liquid coolant in the hood cannot reach the clearance 20 under any credible reactor condition; the conditions likely to cause greatest rise of level are the pressurisation of the coolant (in the case where the hood entry opening is in a position of relatively high coolant pressure), and the contraction of the gas content of the fuel pin when the reactor core cools on shut down. The hood therefore prevents coolant sodium from spilling over into the fuel compartment.

In accordance with the invention, there is carried by an inwardly projecting skirt 23a of the connecting piece 23 a thin stainless steel cup seal 26 having an annular shape with a downturned inner rim forming a lip, the rim being turned through less than 90° but being ground so as to taper down to a fine edge. This edge is engaged resiliently over its full extent with the extension piece 19 and by directing the lip towards the open end of the hood the cup seal 26 therefore forms a non-return valve opposing the return from the hood interior to the vent clearance 20.

Because of the dimensioning of the hood to prevent spill over of liquid into the vent clearance 20, the cup seal is not expected to encounter coolant in the liquid phase; it will however be effective to oppose the ingress of coolant in the vapour phase. A further important function is diffusion retardation. For a better understanding of this further function, it should be borne in mind that during normal service in a reactor operating at full load, a condition will be reached in the fuel pin in which liquid coolant has been expelled from the hood by the generation and expansion of gas within the pin and a steady but very slow venting of gas to the coolant takes place as fresh gas is released from the fuel. Fission product species in the released gas will tend to diffuse more rapidly towards the coolant than the flow rate. At the cup seal there occurs a diffusion gradient which contributes significantly in reducing the freshness, and hence radioactivity, of fission product species ultimately entering the coolant.

The illustrated pin is intended for use in fuel assemblies as more fully described in copending application No. 547,924, filed May 5, 1966, and now Patent No. 3,365,372. For maintaining the spacing of fuel pins clustered together in such an assembly a wire 36 is wrapped in a helix around each of the pins.

With regard to the cup seal, a plurality of such seals in series may be used, possibly in a nested arrangement. By way of indication only, an appropriate thickness when using stainless steel would appear to be 0.015 inch although this thickness will diminish over the taper of the lip. In a ring-like cup seal, as illustrated, the lip may in general be either at the outer or the inner edge.

Another possibility is for the cup seal to be formed on the sheathing itself, bearing in mind that metal sheathing usually has a thickness commensurate with the figure already quoted. In tubular fuel elements, for instance, one or other of the sheaths may be pinched or flared, as the case may be, and the free edge fashioned to form the lip which in this case could be engaged directly with the other sheath. Another construction of fuel element amenable to the provision of a vent path in this way is that having as the outer sheath a fuel container or shell penetrated rather like a calandria by a plurality of coolant flow tubes which represent inner sheathing. This construction is conveniently called a "tube-in-shell" fuel element and in this case unfixed ends of the tubes can be flared to form the cup seal lips which are engaged with the walls of respective bores in the shell.

What I claim is:

1. A nuclear reactor fuel element of the kind wherein ceramic nuclear fuel is disposed between inner and outer tubular parts of sheathing for exposure to flowing liquid coolant, said fuel element comprising an open-ended tubular extension, beyond the body of said fuel, of said inner tubular sheathing, a tubular extension of said outer tubular sheathing co-extensive with said open-ended tubular extension and spaced therefrom for providing a vent path for gaseous fission products from said fuel, a tubular hood part surrounding said extension of said outer tubular sheathing, means for sealingly securing the outer end of said hood part to the outer end portion of said open-ended tubular extension of said inner sheathing for forming a lute chamber with the outer end of which said vent path communicates, means for providing restricted communication between the inner end of said lute chamber and the exterior of the fuel element whereby externally flowing liquid coolant can communicate restrictedly with said lute chamber, and non-return valve means for allowing the flow of gaseous fission products from said vent path into said lute chamber but opposing flow in the reverse direction.

2. A fuel element according to claim 1, wherein said non-return valve means comprises a metallic cup washer, one of the edges of which is formed as an angled lip, and means for securing the other edge of said cup washer to one of the opposed walls of said lute chamber in the outer end region thereof for resilient and continuous engagement of said lip with the complete periphery of the other of said lute chamber walls and with said angled lip directed to face flow in said reverse direction so as to oppose flow in that direction.

References Cited

UNITED STATES PATENTS

| | | | |
|---|---|---|---|
| 2,894,893 | 7/1959 | Carney | 176—79 X |
| 3,139,159 | 6/1964 | Lob | 137—525 X |
| 3,166,498 | 1/1965 | Otto | 137—525 X |
| 3,196,083 | 7/1965 | Hosegood et al. | 176—37 |
| 3,231,154 | 1/1966 | Johnston | 137—525 X |
| 3,238,105 | 3/1966 | McNelly | 176—79 X |
| 3,301,761 | 1/1967 | Johnson et al. | 176—37 |
| 3,324,877 | 6/1967 | Bochan | 137—525 X |

CARL D. QUARFORTH, *Primary Examiner.*

M. J. SCOLNICK, *Assistant Examiner.*